United States Patent
Marra et al.

(10) Patent No.: US 9,971,829 B1
(45) Date of Patent: May 15, 2018

(54) INFERRING MEMBERSHIP IN A GROUP

(75) Inventors: Gregory M. Marra, San Francisco, CA (US); Frances B. Haugen, Mountain View, CA (US)

(73) Assignee: Google LLC, Mountain View, CA (US)

(*) Notice: Subject to any disclaimer, the term of this patent is extended or adjusted under 35 U.S.C. 154(b) by 936 days.

(21) Appl. No.: 13/490,598

(22) Filed: Jun. 7, 2012

(51) Int. Cl.
*G06F 17/30* (2006.01)
*G06Q 50/00* (2012.01)

(52) U.S. Cl.
CPC .. *G06F 17/30696* (2013.01); *G06F 17/30979* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,421,675 B1 * | 7/2002 | Ryan et al. | 707/999.003 |
| 7,340,460 B1 * | 3/2008 | Kapur | G06F 17/30696 |
| 7,363,339 B2 * | 4/2008 | Delany et al. | 709/202 |
| 7,725,422 B2 | 5/2010 | Ryan et al. | |
| 7,805,391 B2 * | 9/2010 | Friedlander et al. | 706/47 |
| 7,822,702 B2 * | 10/2010 | Bodin | G06Q 50/01 705/319 |
| 8,244,721 B2 * | 8/2012 | Morris et al. | 707/723 |
| 8,924,493 B1 * | 12/2014 | Yeskel | G06F 9/542 709/206 |
| 8,938,500 B1 * | 1/2015 | Acharya | G06Q 50/01 705/319 |
| 8,977,617 B1 * | 3/2015 | Wu | G06Q 50/01 707/736 |
| 8,983,948 B1 * | 3/2015 | Haugen | G06Q 50/01 706/12 |
| 9,009,082 B1 * | 4/2015 | Marshall | G06Q 30/0601 705/26.1 |
| 9,262,936 B2 * | 2/2016 | Marra | G06Q 50/01 |
| 2002/0129135 A1 * | 9/2002 | Delany et al. | 709/223 |
| 2003/0055831 A1 * | 3/2003 | Ryan et al. | 707/100 |
| 2003/0088554 A1 * | 5/2003 | Ryan et al. | 707/3 |
| 2006/0195442 A1 * | 8/2006 | Cone et al. | 707/5 |
| 2007/0150470 A1 * | 6/2007 | Brave et al. | 707/6 |
| 2008/0147796 A1 * | 6/2008 | Chmara et al. | 709/204 |
| 2009/0178130 A1 * | 7/2009 | Botz et al. | 726/10 |
| 2009/0204599 A1 * | 8/2009 | Morris et al. | 707/5 |
| 2009/0240677 A1 * | 9/2009 | Parekh et al. | 707/5 |
| 2010/0153363 A1 * | 6/2010 | Suzuki | G06F 17/30463 707/720 |

(Continued)

*Primary Examiner* — Mariela Reyes
*Assistant Examiner* — Mellissa M Ohba
(74) *Attorney, Agent, or Firm* — Fish & Richardson P.C.

(57) ABSTRACT

Techniques for inferring membership in a group may include receiving one or more queries from a user, where the one or more queries have a feature that is independent of a subject matter of the one or more queries and that distinguishes the one or more queries from other queries received from the use. The techniques may include identifying the feature; and, in response to identifying the feature, making an inference that the user is a member of a group based on the subject matter of the one or more queries, where the group has one or more characteristics associated therewith. The techniques may further include attributing the one or more characteristics to the user based on the inference; and selecting the user for distribution of electronic content based on the one or more characteristics.

21 Claims, 5 Drawing Sheets

(56) References Cited

U.S. PATENT DOCUMENTS

| | | | |
|---|---|---|---|
| 2012/0110071 A1* | 5/2012 | Zhou et al. | 709/204 |
| 2013/0073280 A1* | 3/2013 | O'Neil | G06F 17/27 704/9 |
| 2013/0073568 A1* | 3/2013 | Federov | G06F 17/30867 707/749 |
| 2014/0358942 A1* | 12/2014 | Ramesh | 707/748 |
| 2015/0039690 A1* | 2/2015 | Jackson et al. | 709/204 |

* cited by examiner

INFERRING MEMBERSHIP IN A GROUP

BACKGROUND

This disclosure generally relates to inferring membership in a group, and to providing content based on the inferred membership.

Internet-based social networks provide a digital medium for members to interact with one another and to share information. For examples, members are able to distribute electronic content (e.g., textual comments, digital images, digital videos, digital audio, hyperlinks to Web sites, etc.) to other members to whom they might be connected in the social network. Distributed electronic content can be displayed to the members in content streams on their home pages.

Electronic content may be distributed directly from user-to-user, as noted above. Alternatively, electronic content may be sent, e.g., by the social network, to a particular member or group. The content may be based on the actual or perceived interests of the member or group. For example, content relating to the Boston Red Sox may be sent to Red Sox fans, but not to others on the social network. Such content may appear in the members' content stream.

SUMMARY

Described herein are example systems for inferring membership in a group. The systems may include receiving one or more queries from a user, where the one or more queries have a feature that is independent of a subject matter of the one or more queries and that distinguishes the one or more queries from other queries received from the use. The systems may include identifying the feature; and, in response to identifying the feature, making an inference that the user is a member of a group based on the subject matter of the one or more queries, where the group has one or more characteristics associated therewith. The systems may further include attributing the one or more characteristics to the user based on the inference; and selecting the user for distribution of electronic content based on the one or more characteristics. The systems may include one or more of the following features, either alone or in combination.

The one or more queries may be a single query, and the feature may be a size of the single query. The size of the single query may correspond to a number of words in the query. Identifying the feature may include determining that the number of words in the query exceeds a threshold.

The one or more queries may include multiple queries. The feature may correspond to information repeated in a set of the multiple queries. Identifying the feature may include performing a clustering process to identify repeated occurrences of the information.

The information may include words, and the words may be repeated in more than a threshold number of the multiple queries. The one or more queries may include search queries entered into a search engine to search for content, and/or data entered as start or end location into a geographic location system.

The one or more characteristics may include demographic information. The electronic content may include social network posts that relate to the demographic information, and/or advertising content that relates to the demographic information.

The systems may include storing a database correlating the subject matter to the one or more characteristics. Attributing the one or more characteristics to the user may include identifying the one or more characteristics in the database using the subject matter.

Advantages of the foregoing techniques may include, but are not limited to, enabling a system (e.g., a social network) to identify members of a group, and to send content of interest to those members. The techniques may also be useful in sending other content, including advertising, to those members.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
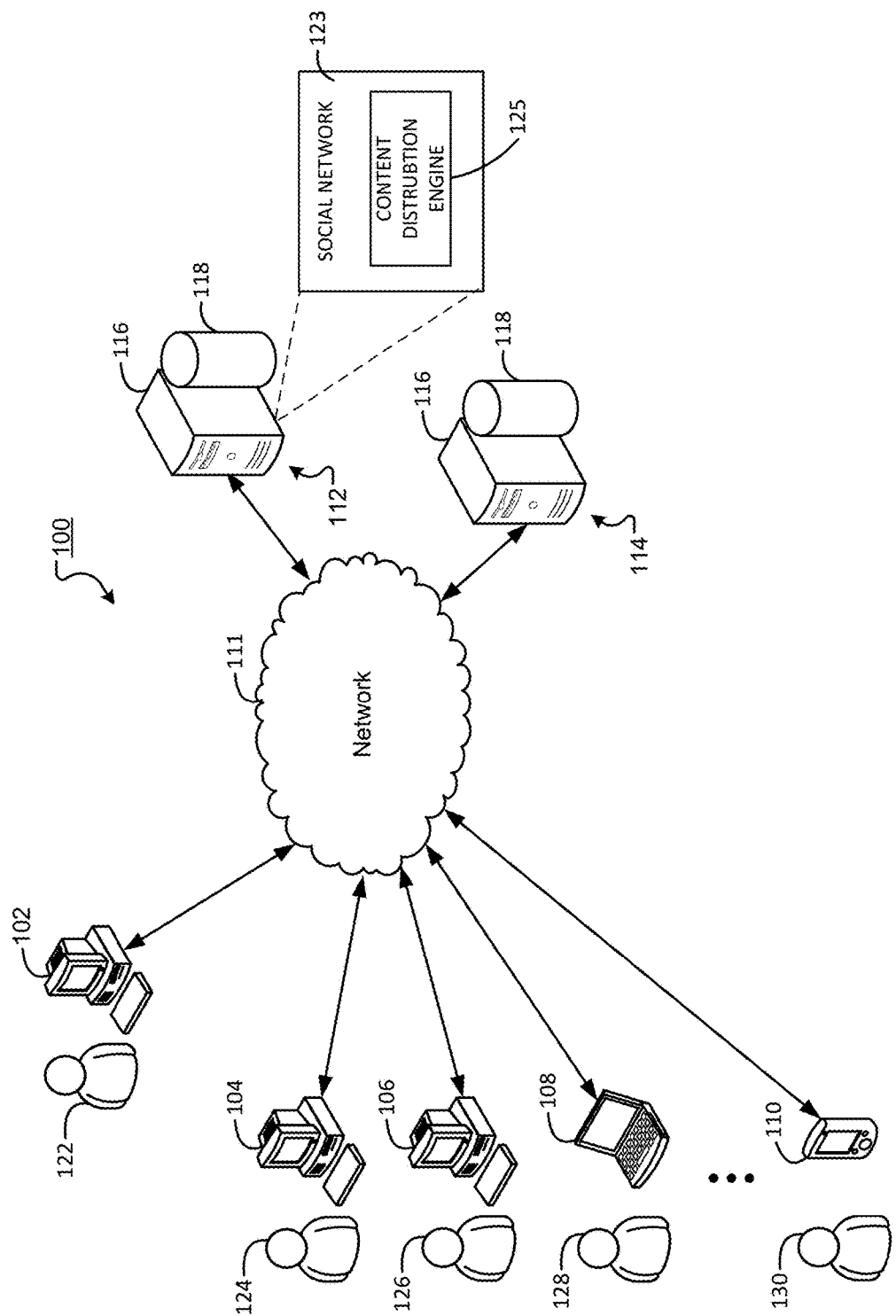
FIG. 1 is a block diagram showing an example of a network environment on which the process described herein may be implemented.

Described herein is a system for inferring membership in a group, and for sending content to members of that group. The system may include receiving one or more queries from a user. The queries may include search queries input to a search engine, queries input to a social networking service or search engine thereof, queries input into a geographic location system, and/or other appropriate queries. The queries have a feature that is independent of their subject matter and that distinguishes them from at least some other queries received from that same user. For example, the queries may have text, images, video, audio, or other content in common. In some cases, the queries may be identical. In another example, an individual query may have a level of specificity that is greater than that of at least some other queries by the user. For example, the individual query may have more than a threshold amount of content, e.g., more than a certain number of words.

In an example implementation, the foregoing system identifies the feature and, in response, makes an inference that the user is a member of a group. For example, the system may compare an input query to a content threshold or identify common content among, e.g., a threshold number of multiple queries by the same user. After identifying one of these features or another appropriate feature, the system makes an inference that the user who issued the one or more queries is a member of a group associated with the corresponding query(ies). For example, if the user repeatedly enters a Boston address into a mapping program, e.g., to find directions to a destination, the system may infer that the user is a Boston resident. From that characteristic, the system may infer other information about the user. For example, the system may infer that the user is interested in information about New England, that the user is a Red Sox fan, and so forth. In another example, if the user inputs, into a search engine, a specific question known to be part of an Economics 101 course mid-term at State University, the system may infer that the user is a student at State University. The system may also make other assumptions about the user, e.g., their graduation year, their major, their age, and so forth.

In an example implementation, the system may store group characteristics in a database. For example, the system may store characteristics associated with groups. In the example above, the system may store expected characteristics of Boston residents in association with a "Boston" group. After identifying that a set of queries is directed to "Boston" or related content (e.g., the "Red Sox", "Copley Square", etc.), the system may attribute the characteristics of the group to the user who issued those queries. Similarly, the system may store expected characteristics of those who are taking Economics 101 at State University. After identifying that a query is specific to a question on an Economics 101 midterm, the system may attribute the characteristics of the group associated with "Economics 101" and/or State University" to the user who issued the query. Thereafter, the system may make available (e.g., send) specific electronic content to the user based on one or more attributed characteristics. In the above examples, the system may incorporate, into the user's social network content stream, information about the Boston Red Sox or information relevant to State University students.

FIG. 1 is a block diagram showing an example of a network environment on which the system described herein may be implemented. FIG. 1 shows example network environment 100. Network environment 100 includes computing devices 102, 104, 106, 108, 110 that are configured to communicate with a first server system 112 and/or a second server system 114 over a network 111. Computing devices 102, 104, 106, 108, 110 have respective users 122, 124, 126, 128, 130 associated therewith. The first and second server systems 112, 114 each includes a computing device 116 and a machine-readable repository, or database 118. Example environment 100 may include many thousands of Web sites, computing devices and servers, which are not shown.

Network 111 may include a large computer network, examples of which include a local area network (LAN), wide area network (WAN), the Internet, a cellular network, or a combination thereof connecting a number of mobile computing devices, fixed computing devices, and server systems. The network(s) included in network 111 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 102, 104, 106, 108, 110 enable respective users 122, 124, 126, 128, 130 to access and to view documents, e.g., Web pages included in Web sites. For example, user 122 of computing device 102 may view a Web page using a Web browser. The Web page may be provided to computing device 102 by server system 112, server system 114 or another server system (not shown).

In example environment 100, computing devices 102, 104, 106 are illustrated as desktop-type computing devices, computing device 108 is illustrated as a laptop-type computing device 108, and computing device 110 is illustrated as a mobile computing device. It is noted, however, that computing devices 102, 104, 106, 108, 110 may include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 102, 104, 106, 108, 110 can participate in a social network 123 hosted, e.g., by the server system 112, by uploading and downloading electronic content to the social network. The electronic content may include, e.g., text comments (e.g., updates, announcements, replies), digital images, videos, audio files, and/or other appropriate information. In some implementations, information can be posted on a user's behalf by systems and/or services external to social network 123 or the server system 112. For example, the user may post a review of a movie to a movie review Web site, and with proper permissions, that Web site may cross-post that review to social network 123 on the user's behalf. In another example, a software application executing on a mobile device, with user permission, may use global positioning system (GPS) capabilities to determine the user's location and automatically update social network 123 with the user's location (e.g., "At Home", "At Work", "In Boston, Mass."). Generally, users interacting with the computing devices 102, 104, 106, 108, 110 can also use social network 123 to define social circles to organize and to categorize the user's relationships to other users of the social network.

Electronic content can be distributed to contacts within social network 123, including one or more social circles, so that such content is viewable by the indicated contacts and/or contacts, or others. In an example operation, a user of social network 123 can generate content and indicate, e.g., one or more individual social network contacts and/or social circles to which the generated content is to be distributed. During a content write-time, a content data set is transmitted from the user's client computing device (e.g., computing device 102 of FIG. 1) to a distribution hub (e.g., a content distribution engine 125), which can be provided at a server (e.g., server system 112 of FIG. 1 or elsewhere on the network). In some implementations, the content data set may include content data (e.g., text, identity of the content author, uniform resource indicator (URI), timestamp data (e.g., a timestamp indicating the time that the content was generated)), distribution data (e.g., data identifying contacts and/ or one or more social circles), and identification (ID) data (e.g., an ID assigned to the content data set upon generation of the content).

In some implementations, other data can be appended to content data sets. Example other data can include scoring data. In some examples, scoring data can include a social affinity score among other possible scoring data. As described in more detail below, affinity identifies the closeness of parties on a social graph.

The scoring data may be recipient specific. For example, the scoring data can include social affinity data that is provided based on respective social affinity scores between an author of the content and each recipient of the content. For example, a first user can author content and define a distribution of the content, creating an underlying content data set. The distribution can include a second user and a third user. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third use. The first social affinity score and the second social affinity score can be appended to the content data set and/or stored in another location while maintaining an association with the content data set.

In some implementations, the distribution data is processed to provide an access control list (ACL) that specifies which contacts within the social network are granted access to the content. In some implementations, content-associated social affinity scores can be processed to provide the ACL. For example, distribution data can indicate that content is to be accessible by, and/or distributed to, a particular user. A social affinity score can be determined for the content and can be specific to a relationship between the content recipient and the author of the content. In some examples, if the social affinity score is below a threshold score, it is determined that the content will not be accessible by, and/or distributed to, the particular user. Consequently, in this example, although the particular user had been explicitly identified for distribution of the content by the author, the particular user is not provided in the ACL for the content. In some examples, if the social affinity score is at or above the threshold score, it is determined that the content will be accessible by, and/or distributed to, the particular user. Consequently, the particular user has been explicitly identified for distribution of the content by the author and the particular user is provided in the ACL for the content.

Generally, the distribution hub determines end points to which the content data set is to be distributed based, e.g., on the ACL. For example, the set of contacts that may care about the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., data store 118 of FIG. 1) and are transmitted to a client device associated with the requesting user. In some implementations, the ACL can be provided based on an overall score, a quality score and/or the social affinity score. Content may be distributed to a user's main page for inclusion in a content stream.

Figure 2:
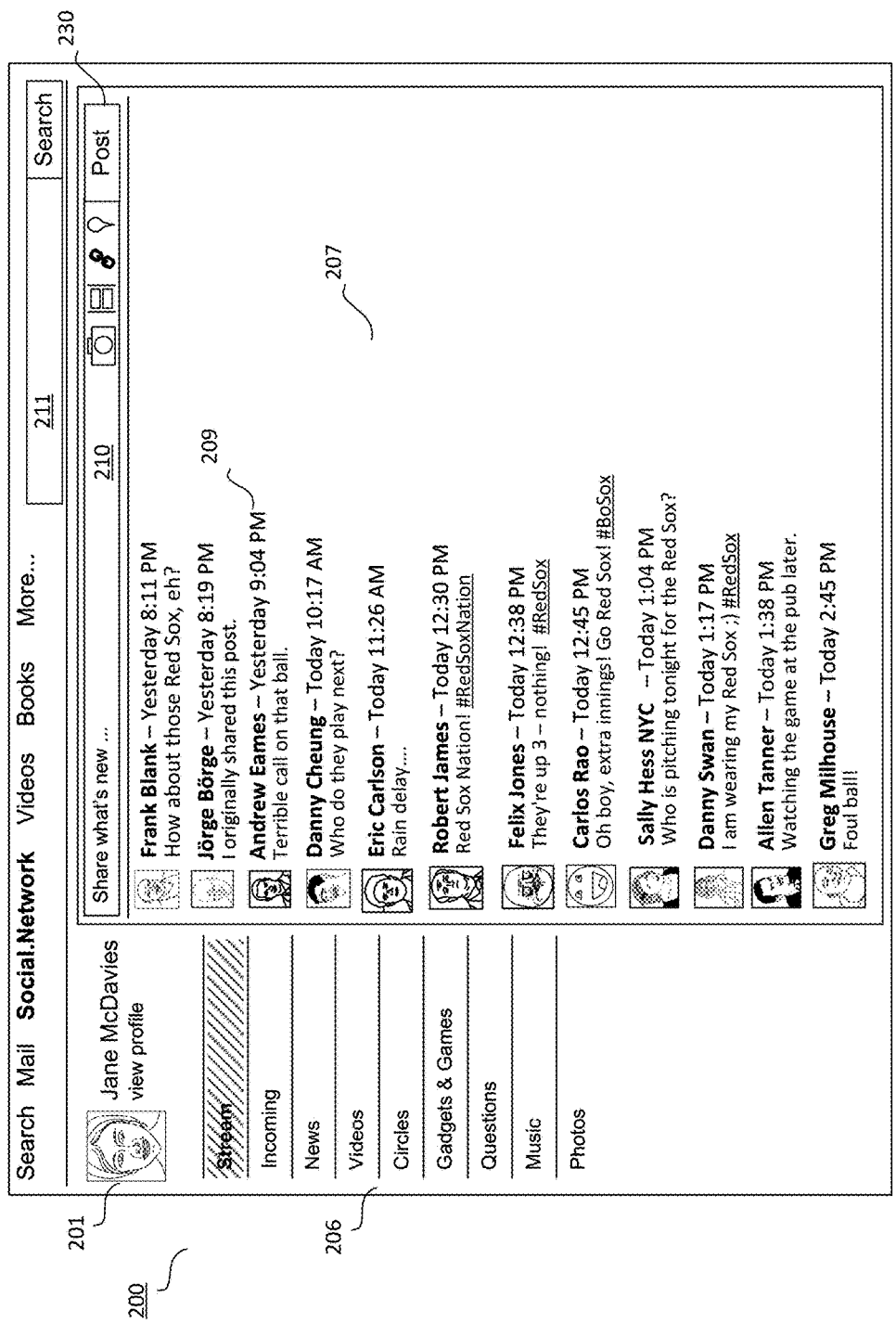
FIG. 2 is an example of a home page of a social network.

FIG. 2 shows an example main page 200 for a user of a social network. For example, page 200 can be provided as a Web page within a Web site of social network 123, and can display electronic content that has been shared with a user 201 associated with the page 200. In the illustrated example, the example user is "Jane McDavies" and page 200 displays, items (e.g., electronic content) that other users have shared with the user and/or items that the user has shared with other users. Page 201 includes a social network menu 206 and a content stream 207, in which items of content are presented. Example content items 209 that have been distributed to the user are displayed in the content stream. Generally, items 209 displayed in content stream 207 include electronic content that is distributed to the user from contacts established within the social network. A content sharing interface 210 can also be provided on page 200. The user can activate (e.g., click on) the content sharing interface 210 to share electronic content. Although twelve content items are depicted in FIG. 2, it is appreciated that page 200 can display more or less than twelve content items to the user. A search field 211 can also be provided on page 200 to search social network 123 for content.

The techniques described herein may be used to determine which content items to distribute to the user in the user's content stream. In an example, the processes may distribute content based on one or more characteristics of the user, e.g., based on the user's demographics or interests, as inferred from membership in a group or groups. The membership in the group or groups may be inferred from one or more queries provided by the user and/or others.

Figure 3:
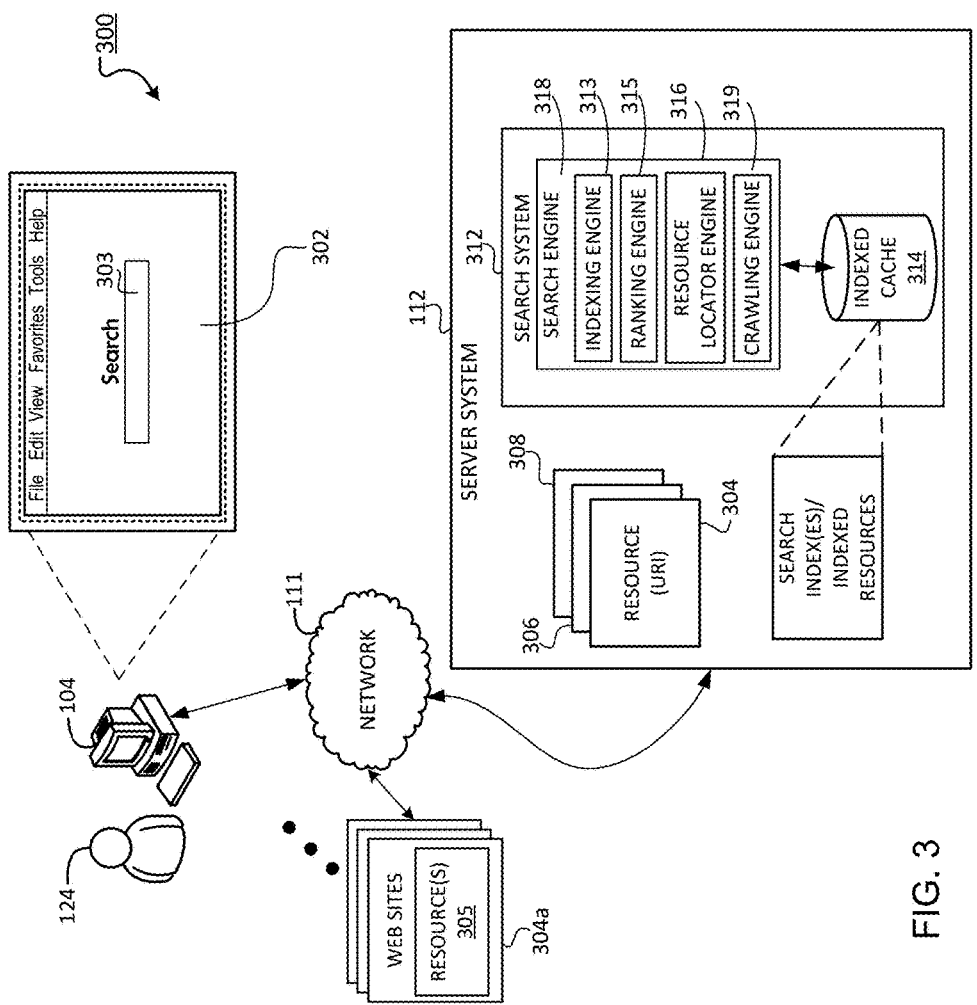
FIG. 3 is an example of a portion of the network environment of FIG. 1.

FIG. 3 is a block diagram of an example part of the network environment of FIG. 1. Specifically, FIG. 3 shows portion 300 of example network environment 100. In this example implementation, server system 112 stores resources 304, 306, 308. A resource has an associated resource identifier (Resource ID). For example, resources 304, 306, 308 may correspond to different Web pages of the same Web site, or may correspond to Web pages of different Web sites. As explained below, in this example operation, computing device 104 communicates with server system 112 to display a home Web page ("home page") 302 of a search engine Web site and a home page of a social network (e.g., page 200 of FIG. 2 containing the user's content stream).

To view a Web page, user 124 may input or select a Resource ID using a Web browser that is executed on computing device 104. The Resource ID may include, for example, a URI or a uniform resource locator (URL). A request including the Resource ID is transmitted from computing device 104 to server system 112 over network 111. In response, the server system identifies the requested resource based on the Resource ID, and transmits the requested resource to computing device 104 over network 111. For example, the resource may be home page 200 of social network 123 or a home page 302 of search system 312. In some implementations, search system 312 is part of social network 123 or it is independent thereof yet able to access content from social network 123.

Page 302 for search system 312 may include a field 303 for inputting a search query that is transmitted to the search system. The search query may include, e.g., one or more terms, images, audio, video, or other content. In response, the search system performs a search of an indexed cache containing one or more search indexes, and returns a search results list to a user. The search results list may include, e.g., links to content that is deemed relevant to the search terms. Search system 312 may be implemented, e.g., on server system 112 as shown or on other appropriate hardware.

Search system 312 includes a search engine 318 and one or more search indexes. Search system 312 identifies resources 305 (e.g., Web pages, images, news articles, user-generated content, social information (e.g., from social network 123), or other public and/or private resources) provided by content publishers on Web sites 304a. Appropriate permission(s) may be required to access non-public content.

Search system 312 includes a crawling engine 319 to crawl resources, and an indexing engine 313 to index those resources in one or more search indexes (referred to collectively as "search index") stored, e.g., in indexed cache 314. Search engine 318 also includes a resource locator engine 316 for identifying resources within the search index that are responsive to, and that may be relevant to, a query (for example, by implementing a query text matching routine). A ranking engine 315 ranks resources deemed relevant to the search query.

Social graph information may be included in a same search index as other resources or in a separate search index (not shown). The social graph information may include, e.g., comments, endorsements, connections, affinities, and so forth related to indexed content and to a user's social graph. The social graph information may include content from social network 123. A separate search may be performed for general search results responsive to a query, as well as particular search results, that identify resources associated with the user's social graph (e.g., endorsed Web content).

In some implementations, information associated with the user's social graph may be indexed by generating and incorporating suitable data structures, e.g., social restricts, into an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

User-generated content (e.g., social network content) may be included in a same index as other resources or in a separate index, as noted above. In this regard, with appropriate permission, crawling engine 319 may crawl user-generated content (of both the searcher and others, e.g., members of the searcher's social graph), and indexing engine 313 may incorporate that content into an appropriate search index. Resource locator engine 316 may identify that user-generated content based, e.g., on a relevance score of the user-generated content to a search query and based, e.g., on other information, including, e.g., the social connection of the searcher to the content itself or to an author of the content. In this regard, the existence or non-existence of a social connection to the content or author may affect the relevance score. In this context, an author is not limited to one who created the content, but may include, e.g., anyone who interacted with the content, shared the content, endorsed the content, posted the content, and so forth.

In response to a search query, search engine 318 may access indexed cache 314 to identify resources 305 that are relevant to the search query. Resource locator engine 316 identifies resources 305 in the form of search results and returns the search results to a requesting device in search results pages. A search result may include data generated by search system 312 that includes a resource, identifies a resource, and/or includes a link to a resource, along with images, video, or other appropriate content. An example search result may include a Web page title, a snippet of text or a portion of an image extracted from the Web page, and the URL of the Web page. In some cases, the search results may also include social information. For example, included with some of the search results may be comments, endorsements, or other information obtained about the search results from a user's social graph. The social information may also be used to affect retrieval, ranking, and display of the search results. The search results may also include user-generated content displayed alone or in association with relevant social information (e.g., a link to a content author's profile). Search results may be displayed in a user's content stream along with other content. For example, a user may conduct a search of the social network from their main page, and the results may be displayed in their content stream along with others' posts.

Figure 4:
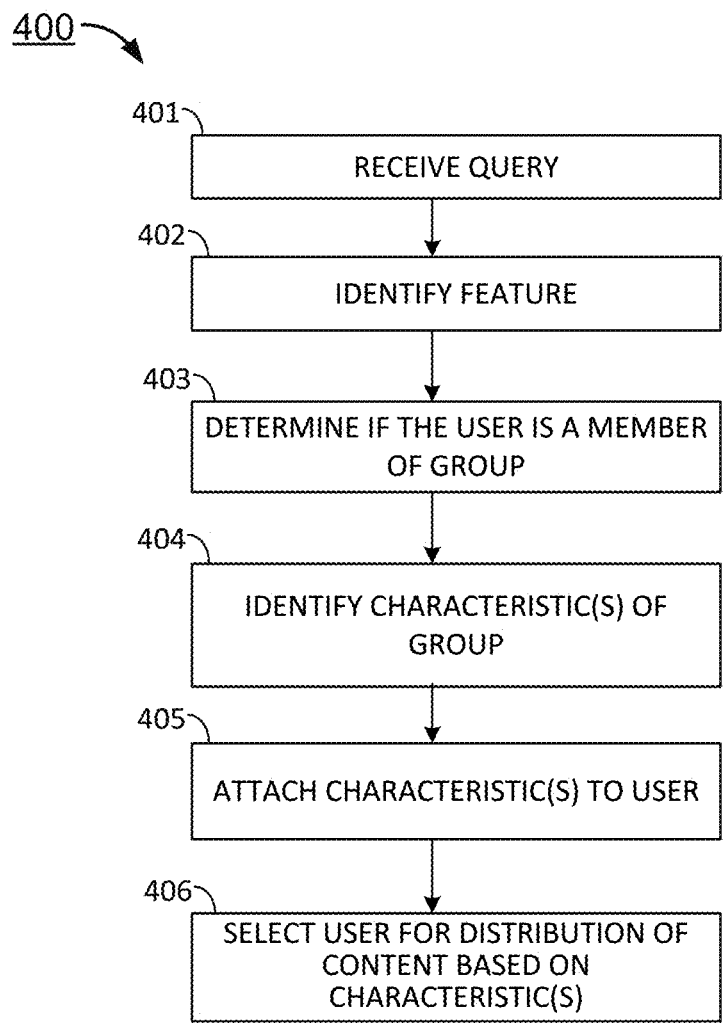
FIG. 4 is an example of a process for inferring membership in a group and for providing content based on that inference.

FIG. 4 is a flowchart showing an example of a process 400 for inferring that a user is a member of a group, and for selecting that user to receive content based on the inferred group membership. Process 400 may be performed, e.g., by search engine 318 in combination with content distribution engine 125.

According to process 400 a query is received (401) from a user. For example, search engine 318 may receive the query through its home page 302 (FIG. 3). In this example, the received query is associated with a feature that is independent of a subject matter of the query, and that distinguishes the received query from at least some other queries received from that same user or others. For example the received query may be more specific than the average query received from the user or other users over a course of time. For instance, it may be known that the average query from the user or from other users is six words in length. A received query may be deemed more specific than the average query if the received query has a number of words (or other content) that exceeds a threshold number of words (or other content). For example, to be deemed a more specific query, the received query may simply exceed the length of the average query, exceed the length of the average query by a certain percentage, be some multiple of the length of the average query, or have another relationship to the average query.

In another example, the feature that is independent of a subject matter of the received query may be its repetition frequency. For example, the received query, or portion(s) thereof, may have been repeatedly input by the user a number of times over the course of time. The number of times may be, e.g., more than a predefined threshold number. The course of time may be an appropriate time including, but not limited to, the past week, month, year, or account lifetime. The entire query may have been repeated verbatim or a portion of the query may have been repeated. For example, input queries may include requests for directions from "#9 ABC Street, Boston", "ABC Street, Boston", "ABC Boston, Mass.". In the case of these repeated queries, the portion of the query repeated is "ABC" and "Boston".

In another example, the feature that is independent of a subject matter of the received query may also be related to repetition frequency. In this case, however, the repetition frequency may be for a group of users. For example, a group of users may repeat the same query, or a portion thereof, within a period of time. For example, the group of users may repeat the following query, or a variation thereof, multiple times near to the end of a college semester: "Identify the shape of the demand curve for an addictive product?".

Clustering processes may be used to identify repeated content in multiple queries. For example, similar or identical words may be identified and assigned to groups. In some cases, synonyms or words having similar meanings may be identified and taken into account during the clustering processes.

In the above two examples relating to repetition frequency, the length of a query need not be taken into consideration, e.g., the received query may be of average length or have a length that is greater than, or less than, average. In such examples, the number of repetitions may be as low as two or as high as a hundred, thousand, million, and so forth. In other examples, the repetition frequency and query specificity may have an inverse relationship. For example, the number of repetitions identified may be less for more specific queries. Conversely, the number of repetitions identified may be more for less specific queries.

After the query is received (401), the above-described feature is identified (402). In this regard, the feature is independent of the subject matter of the query in the sense that the feature is identifiable regardless of the subject matter of the received query. For example, if the feature is query specificity defined, e.g., by the number of words in the query, the meanings of the words in the query need not be known to determine the number of words. In another example, if the feature is repetition frequency defined, e.g., by the number of times a word or word has been repeated throughout multiple queries, the subject of those words need not be identified to determine the frequency of repetition. More specifically, the words themselves may be identified to determine the repetition frequency, but their meanings need not be ascertained in order to determine if those words have been repeated. The meanings of the words in the queries (e.g., the subject matter of the query) may be used in process 400 in the manner described below. In some implementations, content distribution engine 125, either alone or in combination with search engine 318, may identify the feature. For example, if the feature relates to repetition frequency, search engine 318 may search a database of prior search queries to identify instances of repetition.

According to process 400, an inference (403) is made that the user who input the received query is a member of a group of users who have attributes in common. The inference is made, at least in part, based on the subject matter of the received query and, in some cases, one or more other queries input by the user himself/herself or others. More specifically, after the feature is identified, key words in the query may be identified and used to search a database (e.g., a search index in indexed cache 314) to identify one or more others who have input the same or similar queries over a course of time. In this context, a "similar" query may include search queries with at least one content item (e.g., key word, image, video, etc.) in common or queries with content items in common that have the same or similar meanings (e.g., "Boston", "Beantown", "The Hub", and so forth). In some implementations, search engine 318 may perform the search to generate search results, and content distribution engine 215 may make the inference that the user who input the search query is a member of a group of users.

The group may be defined based, e.g., on the subject matter of the query and features like those described above, e.g., query specificity and repetition. For example, the group may be freshman at State University, residents of ABC street in Boston, and so forth. The group may be as small as two users or may include tens, hundreds, thousands, etc. of users. In some implementations, operations 402 and 403 may be a single operation.

In some implementations, membership in a group may be inferred by comparing input query(ies) to input query(ies) of other users who are declared to be members of the group. For example, if it is determined that a user's input queries are similar (e.g., about the same subject matter) to those of another user, and that other user has already declared himself or herself to be a group member (e.g., a Boston resident), then it may also be inferred that the user who input the same query(ies) is a Boston resident and, therefore, a member of the same group.

One or more characteristics of the group are identified (404). In this regard, a database (e.g., in a search index in indexed cache 314) may contain information (e.g., characteristics) associated with a particular group of users. The information may be gathered and stored automatically (e.g., without human intervention) or manually. The information may be retrieved, e.g., by search engine 318. More specifically, information pertaining to a group of users may be stored in association with one or more identifiers pertaining to that group. By way of example, it may be known that a specific search query relates to economics appears on a State University Freshman Economics class. Knowing this, it may be inferred that users who make this specific search query are part of a specific demographic. For example it may be inferred the such users are part of groups who attend state university, are freshman at State University, were born in a certain year, will graduate in a certain year, have an interest in economics (particularly if the course is mainly for economics majors), live in a town, city, state where State University is located, and so forth. In another example, if a user repeatedly inputs, e.g., a Boston address as a start or end point in a directions or mapping program, it may be inferred that the user is a resident of Boston. The system may therefore infer that the user has characteristics associated with Boston residents, e.g., sports team affiliations, and so forth. More specific characteristics may be associated with more specific addresses. For example, levels of affluence may be assumed for certain addresses.

Furthermore, other system information may be used to confirm an inference that a user is a member of group. For example, if the system is able to determine that the user is querying from an IP address at State University or has previously identified himself or herself as a State University student, there may be a higher level of confidence that the other characteristics of the group are attributable to the user (e.g., that the user is a freshman at state university, was born in a certain year, will graduate in a certain year, has an interest in economics, lives in a town, city, state where State University is located, and so forth.

The characteristic(s) of the group with which the user is associated are attributed (405) to the user. This is known "smearing" data from the group to the user. In other words, given the user's membership in the group, it is determined that the user will also have the characteristics of the group. So, from an example above, if it is determined that the user's search query related to economics appears on a State University freshman economics mid-term, one or more of the following characteristics may be associated with the user who input the query: the user attends State University, is freshman at state university, was born in a certain year, will graduate in a certain year, has an interest in economics, lives in a town, city, state where State University is located, and so forth. In an example implementation, content distribution engine 125 may associate the characteristic(s) to the user.

The user may be selected (406) for distribution of content, e.g., by content distribution engine 125, based on the characteristic(s) associated from the group. For example, advertising may be sent to the user based on those characteristics. The advertising may be sent, e.g., by a content management system that works with search engine 318 or other Web sites to provide advertising, e.g., with Web sites or search results. In other examples, the advertising may become part of the user's content stream of a social networking service. In still other examples, the content need not be advertising, but simply information that may be deemed relevant (e.g., of interest) to the user. The information may be incorporated into the user's content stream or elsewhere. Content may be provided to the user's content stream in an appropriate manner, an example of which is provided above.

Figure 5:
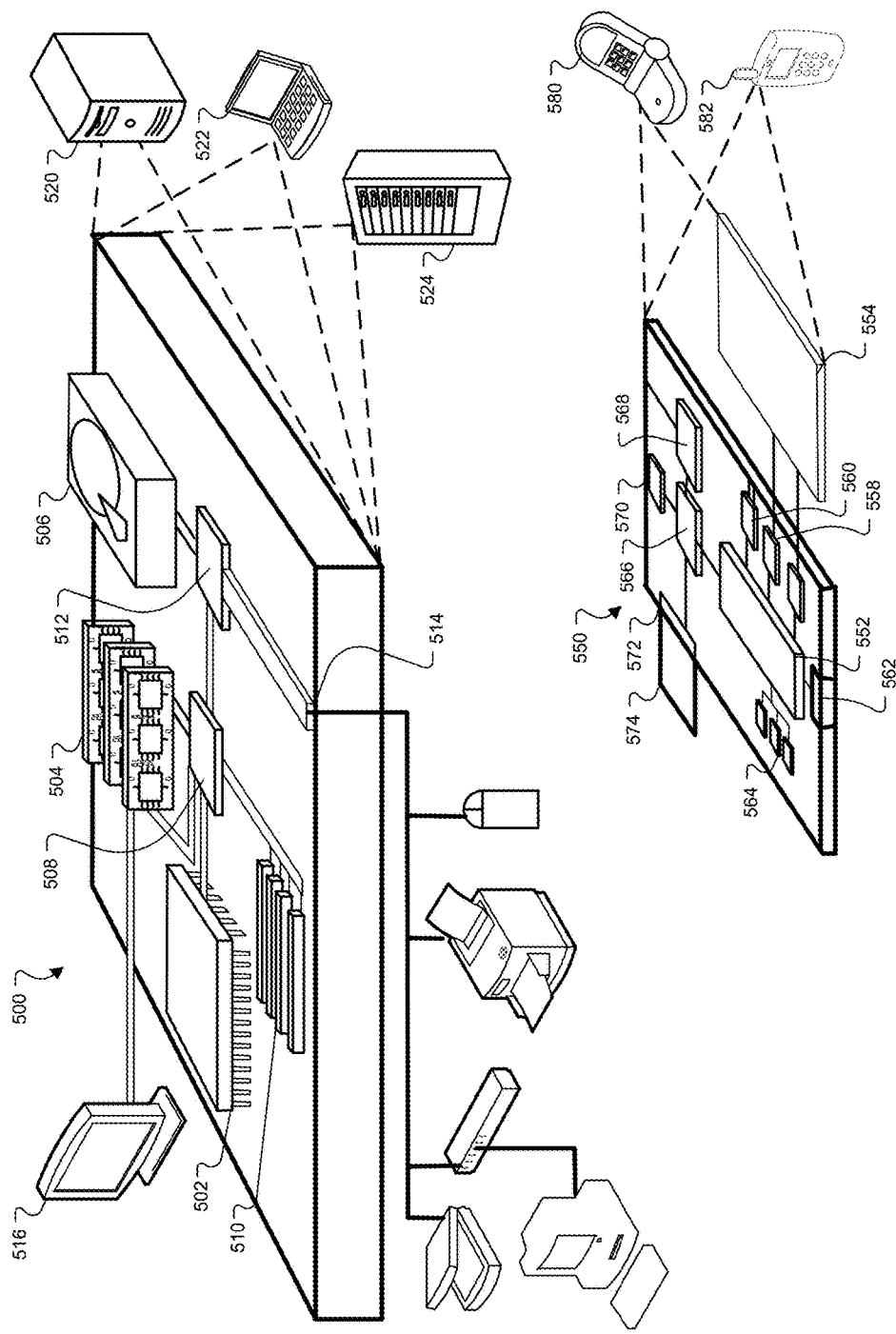
FIG. 5 shows examples of computing devices on which the processes described herein, or portions thereof, may be implemented.

FIG. 5 shows examples of computing devices on which the processes described herein, or portions thereof, may be implemented. In this regard, FIG. 5 shows an example of a generic computing device 500 and a generic mobile computing device 550, which may be used to implement the processes described herein, or portions thereof. For example, social network 123 and/or search system 312 may be implemented on computing device 500. Mobile computing device 550 may represent a client device of FIG. 1. Other client devices of FIG. 1 may also have the architecture of computing device 500.

Computing device 500 is intended to represent various forms of digital computers, examples of which include laptops, desktops, workstations, personal digital assistants, servers, blade servers, mainframes, and other appropriate computers. Computing device 550 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, for example, display 516 coupled to high speed interface 508. In other implementations, multiple processors and/or multiple buses may be used, as appropriate, along with multiple memories and types of memory. Also, multiple computing devices 500 may be connected, with a device providing a portion of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, examples of which include a magnetic or optical disk.

The storage device 506 is capable of providing mass storage for the computing device 500. In one implementation, the storage device 506 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, including those described above. The information carrier may be a non-transitory computer- or machine-readable medium, for example, the memory 504, the storage device 506, or memory on processor 502. For example, the information carrier may be a non-transitory, machine-readable storage medium.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer, e.g., a laptop computer 522. Alternatively, components from computing device 500 may be combined with other components in a mobile device (not shown), e.g., device 550. Such devices may contain one or more of computing device 500, 550, and an entire system may be made up of multiple computing devices 500, 550 communicating with one other.

Computing device 550 includes a processor 552, memory 564, an input/output device, e.g. a display 554, a communication interface 566, and a transceiver 568, among other components. The device 550 may also be provided with a storage device, e.g., a microdrive or other device, to provide additional storage. The components 550, 552, 564, 554, 566, and 568, are interconnected using various buses, and several of the components may be mounted on a common motherboard or in other manners as appropriate.

The processor 552 may execute instructions within the computing device 550, including instructions stored in the memory 564. The processor may be implemented as a chipset of chips that include separate and multiple analog and digital processors. The processor may provide, for example, for coordination of the other components of the device 550, e.g., control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, e.g., using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, e.g., through a speaker, e.g., in a handset of device 550. Such sound may include sound from voice telephone calls, may include recorded sound (e.g., voice electronic messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be a form of sensory feedback (e.g., visual feedback, auditory feedback, or tactile feedback); and input from the user may be received in a form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or a combination of such back end, middleware, or front end components. The components of the system may be interconnected by a form or medium of digital data communication (e.g., a communication network). Examples of communication networks include a local area network ("LAN"), a wide area network ("WAN"), and the Internet.

The computing system may include clients and servers. A client and server are generally remote from one other and typically interact through a communication network. The relationship of client and server arises by virtue of computer programs running on the respective computers and having a client-server relationship to one other.

In some implementations, the engines described herein may be separated, combined or incorporated into a single or combined engine. The engines depicted in the figures are not intended to limit the systems described here to the software architectures shown in the figures.

For situations in which the systems and techniques discussed herein collect personal information about users, that information may be anonymized in one or more ways before it is stored or used, so that personally identifiable information is removed. For example, a user's identity may be anonymized so that no personally identifiable information may be determined for the user, or a user's geographic location may be generalized where location information is obtained (e.g., to a city, zip code, or state level), so that a particular location of the user cannot be determined.

Although implementations are discussed primarily in the context of electronic content generated and distributed in the form of electronic messages, implementations are applicable to other content types including, for example, chat content, social networking posts, content posted to sharing services (e.g., photo sharing services), content posted to a blogging services, and so forth.

Implementations may include presenting user-generated content from members of the searcher's social graph, user-generated content from parties who are not members of the searcher's social graph, non-user generated content from on or off a social graph, or a combination of the foregoing. For example, if a user is searching for a particular topic, if available and appropriate permissions have been obtained, user-generated content from experts on that topic may be presented, even if those experts are not part of the searcher's social graph.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

The features described herein may be combined in a single system, or used separately in one or more systems.

Other implementations not specifically described herein are also within the scope of the following claims.

What is claimed is:

1. A method performed by one or more processing devices, comprising:
   receiving one or more queries from a user during a period of time;
   identifying the one or more queries as being distinguished from one or more other queries received from the user by performing operations comprising:
      for each of the one or more other queries:
         determining a frequency of input by the user of the other query during the period of time;
         for each of the one or more queries received:
            comparing the frequency of input by the user of the other query to a frequency of input of the query received during the period of time; and
            determining, based on the comparing, that a difference between the frequency of input by the user of the other query and the frequency of input of the query received satisfies a threshold;
   in response to identifying the one or more queries as being distinguished, making an inference that the user is a member of a group based on a subject matter of the one or more queries, the group having one or more characteristics associated with the subject matter of the one or more queries identified as being distinguished from the one or more other queries received from the user;
   determining a likelihood that the inference is correct by comparing the frequency of input of each of the one or more queries received during the period of time to one or more frequencies of one or more respective other queries that have the subject matter of the one or more queries and that are submitted by members of the group during the period of time;
   following the determining, attributing the one or more characteristics to the user based on the inference;
   based on the one or more characteristics, identifying the user for distribution of electronic content authored by one or more members of the group;
   determining a score for the electronic content, the score being associated with a social relationship between the user and an author of the electronic content, the author being a member of the group, wherein determining the score for the electric content comprises analyzing an affinity of a social relationship represented in a social graph between the user and the author;
   following the identifying of the user for distribution of the electronic content, making a determination to provide the user with access to the electronic content based on the score exceeding a threshold score; and
   providing the user with access to the electronic content based on the determination.

2. The method of claim 1, wherein the one or more queries comprises a single query; and
   wherein identifying the one or more queries as being distinguished from one or more other queries received from the user comprises determining the size of the single query and comparing the size of the single query to a threshold size.

3. The method of claim 2, wherein the size of the single query comprises a number of words in the query; and
   wherein identifying the one or more queries as being distinguished from one or more other queries received from the user comprises determining that the number of words in the query exceeds a threshold number of words.

4. The method of claim 1, wherein the one or more queries comprises multiple queries;
   wherein the multiple queries comprise information repeated in a set of the multiple queries; and
   wherein identifying the one or more queries as being distinguished from one or more other queries received from the user comprises performing a clustering process to identify repeated occurrences of the information.

5. The method of claim 1, wherein the one or more queries comprises multiple queries;
   wherein the multiple queries comprise information repeated in a set of the multiple queries; and
   wherein the information comprises words, the words being repeated in more than a threshold number of the multiple queries.

6. The method of claim 1, wherein the one or more queries comprise search queries entered into a search engine to search for content.

7. The method of claim 1, wherein the one or more queries comprise data entered as start or end location into a geographic location system.

8. The method of claim 1, wherein the one or more characteristics comprises demographic information; and
   wherein the electronic content comprises social network posts that relate to the demographic information.

9. The method of claim 1, wherein the one or more characteristics comprises demographic information; and
   wherein the electronic content comprises advertising content that relates to the demographic information.

10. The method of claim 1, further comprising:
  storing a database correlating the subject matter to the one or more characteristics; and
  wherein attributing the one or more characteristics to the user comprises identifying the one or more characteristics in the database using the subject matter.

11. One or more non-transitory machine-readable storage media storing instructions that are executable by one or more processing devices to perform operations comprising:
  receiving one or more queries from a user during a period of time;
  identifying the one or more queries as being distinguished from one or more other queries received from the user by performing operations comprising:
    for each of the one or more other queries:
      determining a frequency of input by the user of the other query during the period of time;
      for each of the one or more queries received:
        comparing the frequency of input by the user of the other query to a frequency of input of the query received during the period of time; and
        determining, based on the comparing, that a difference between the frequency of input by the user of the other query and the frequency of input of the query received satisfies a threshold;
  in response to identifying the one or more queries as being distinguished, making an inference that the user is a member of a group based on a subject matter of the one or more queries, the group having one or more characteristics associated with the subject matter of the one or more queries identified as being distinguished from the one or more other queries received from the user;
  determining a likelihood that the inference is correct by comparing the frequency of input of each of the one or more queries received during the period of time to one or more frequencies of one or more respective other queries that have the subject matter of the one or more queries and that are submitted by members of the group during the period of time;
  following the determining, attributing the one or more characteristics to the user based on the inference;
  based on the one or more characteristics, identifying the user for distribution of electronic content authored by the one or more members of the group;
  determining a score for the electronic content, the score being associated with a social relationship between the user and an author of the electronic content, the author being a member of the group, wherein determining the score for the electric content comprises analyzing an affinity of a social relationship represented in a social graph between the user and the author;
  following the identifying of the user for distribution of the electronic content, making a determination to provide the user with access to the electronic content based on the score exceeding a threshold score; and
  providing the user with access to the electronic content based on the determination.

12. The one or more non-transitory machine-readable storage media of claim 11, wherein the one or more queries comprises a single query; and
  wherein identifying the one or more queries as being distinguished from one or more other queries received from the user comprises determining the size of the single query and comparing the size of the single query to a threshold size.

13. The one or more non-transitory machine-readable storage media of claim 12, wherein the size of the single query comprises a number of words in the query; and
  wherein identifying the one or more queries as being distinguished from one or more other queries received from the user comprises determining that the number of words in the query exceeds a threshold number of words.

14. The one or more non-transitory machine-readable storage media of claim 11, wherein the one or more queries comprises multiple queries;
  wherein the multiple queries comprise information repeated in a set of the multiple queries; and
  wherein identifying the one or more queries as being distinguished from one or more other queries received from the user comprises performing a clustering process to identify repeated occurrences of the information.

15. The one or more non-transitory machine-readable storage media of claim 11, wherein the one or more queries comprises multiple queries;
  wherein the multiple queries comprise information repeated in a set of the multiple queries; and
  wherein the information comprises words, the words being repeated in more than a threshold number of the multiple queries.

16. The one or more non-transitory machine-readable storage media of claim 11, wherein the one or more queries comprise search queries entered into a search engine to search for content.

17. The one or more non-transitory machine-readable storage media of claim 11, wherein the one or more queries comprise data entered as start or end location into a geographic location system.

18. The one or more non-transitory machine-readable storage media of claim 11, wherein the one or more characteristics comprises demographic information; and
  wherein the electronic content comprises social network posts that relate to the demographic information.

19. The one or more non-transitory machine-readable storage media of claim 11, wherein the one or more characteristics comprises demographic information; and
  wherein the electronic content comprises advertising content that relates to the demographic information.

20. The one or more non-transitory machine-readable storage media of claim 11, wherein the operations further comprise:
  storing a database correlating the subject matter to the one or more characteristics; and
  wherein attributing the one or more characteristics to the user comprises identifying the one or more characteristics in the database using the subject matter.

21. A computer system comprising:
  one or more processing devices; and
  one or more machine-readable hardware storage devices storing instructions that are executable by the one or more processing devices to perform operations comprising:
    receiving one or more queries from a user during a period of time;
    identifying the one or more queries as being distinguished from one or more other queries received from the user by performing operations comprising:
      for each of the one or more other queries:
        determining a frequency of input by the user of the other query during the period of time;
        for each of the one or more queries received:

comparing the frequency of input by the user of the other query to a frequency of input of the query received during the period of time; and determining, based on the comparing, that a difference between the frequency of input by the user of the other query and the frequency of input of the query received satisfies a threshold;

in response to identifying the one or more queries as being distinguished , making an inference that the user is a member of a group based on a subject matter of the one or more queries, the group having one or more characteristics associated with the subject matter of the one or more queries identified as being distinguished from the one or more other queries received from the user;

determining a likelihood that the inference is correct by comparing the frequency of input of each of the one or more queries received during the period of time to one or more frequencies of one or more respective other queries that have the subject matter of the one or more queries and that are submitted by members of the group during the period of time;

following the determining, attributing the one or more characteristics to the user based on the inference;

based on the one or more characteristics, identifying the user for distribution of electronic content authored by one or more members of the group;

determining a score for the electronic content, the score being associated with a social relationship between the user and an author of the electronic content, the author being a member of the group, wherein determining the score for the electric content comprises analyzing an affinity of a social relationship represented in a social graph between the user and the author;

following the identifying of the user for distribution of the electronic content, making a determination to provide the user with access to the electronic content based on the score exceeding a threshold score; and providing the user with access to the electronic content based on the determination.

* * * * *